Patented July 29, 1924.

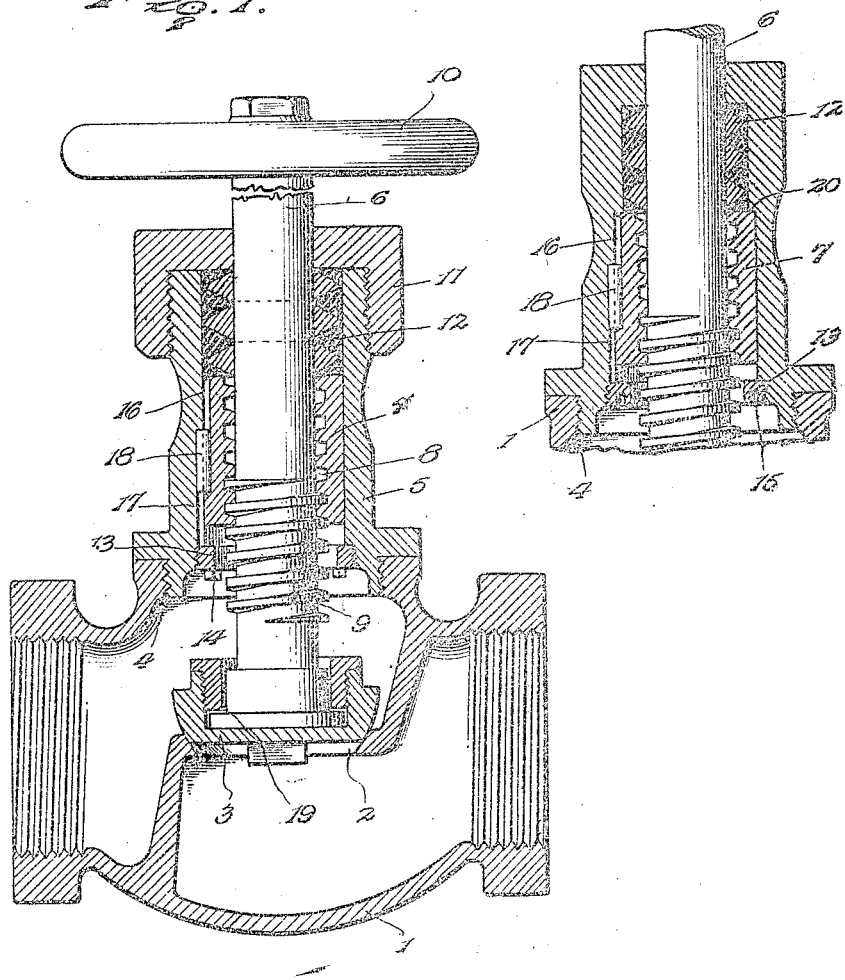

1,502,734

UNITED STATES PATENT OFFICE.

TREVILLE OWEN MARTIN, OF JACKSON, TENNESSEE, ASSIGNOR OF ONE-HALF TO WILLIAM T. YOUNG, OF INDIANAPOLIS, INDIANA, AND ONE-HALF TO WILLIAM H. TIMMONS, OF JACKSON, TENNESSEE.

VALVE.

Application filed June 22, 1923. Serial No. 647,067.

*To all whom it may concern:*

Be it known that I, TREVILLE OWEN MARTIN, a citizen of the United States, residing at Jackson, in the county of Madison and State of Tennessee, have invented certain new and useful Improvements in Valves, of which the following is a specification.

My present invention relates to cut-off valves and has special reference to means for preventing leakage around the valve stem. The object of the invention is to provide a construction which will permit packing to be placed in the bonnet through either end thereof, and also to provide means whereby the packing will be held in compressed condition around the stem so as to positively prevent leakage. A further object of the invention is to provide a valve bonnet which may be applied to any cut-off valve and to provide means whereby the packing within the bonnet will be maintained under pressure whether the valve be in opened or closed position, the pressure being automatically increased when the valve is closed. Other incidental objects of the invention will appear in the course of the following description.

In the accompanying drawing:

Figure 1 is a sectional elevation of a valve embodying the invention;

Fig. 2 is a detail showing a slight modification.

The valve casing 1 may be of any preferred or well-known form and is provided with an internal seat 2 cooperating with the valve head 3. The valve casing is provided with an internally threaded opening, indicated at 4, in its upper side and the lower end of the bonnet 5 is threaded into the said opening, as clearly shown. The bonnet is of elongated tubular form and its bore is preferably straight although it may be tapered. The bore of the bonnet is considerably larger in diameter than the stem 6 of the valve, and a floating nut 7 is fitted in the lower end of the bore, this nut being internally threaded, as shown at 8, to be engaged by the threaded portion 9 of the valve stem. The valve stem projects through the upper end of the bonnet and is equipped with any preferred form of handle 10 whereby the valve may be opened or closed. A cap nut 11 is threaded onto the upper end of the bonnet and packing 12 of any known or preferred form is disposed within the bore of the bonnet over the floating nut 7, completely filling the space between the said nut and the cap nut. A stop collar or ring 13 is threaded into the lower end of the bore of the bonnet to limit the downward movement of the floating nut 7 and prevent the same dropping into the valve casing when pressure is withdrawn or breaking occurs in the threaded connection between said nut and the valve stem. The stop collar is suitably constructed to be engaged by a turning tool, as by being provided with lugs 14 shown in Fig. 1 or with sockets 15 shown in Fig. 2.

In the circumferential surface of the nut 7 is a longitudinal groove 16 and in the wall of the bonnet is a longitudinal groove 17 adapted to aline with the groove 16 and a key 18 is fitted in the said grooves, as shown, whereby rotation of the floating nut is prevented but sliding movement thereof is permitted. The lower end of the groove 16 is located above the lower end of the nut and the upper end of the groove 17 is below the upper end of the nut so that, when the ends of the key abut the respective ends of the grooves, as shown in the drawing, the upward movement of the nut will be arrested.

The valve 3 is swiveled upon the lower end of the stem 5, as shown at 19 in Fig. 1, so that after the valve is seated it will not turn with the stem and scratching of the valve and its seat will be avoided.

If desired, the bonnet may be provided with an internal shoulder 20 to limit the upward movement of the floating nut, as shown in Fig. 2, and the cap nut 11 may be omitted and the bonnet provided at its upper end with an internal flange 21 to form an abutment for the packing, as also shown in Fig. 2.

In practice, the valve casing is fitted to a pipe in the usual manner and the valve is opened or closed by rotating the stem, the rotation of the stem causing the same to move upwardly or downwardly through the floating nut 7 by reason of its threaded engagement with said nut. The floating nut provides a substantial and positive support for the packing and maintains the same under compression so that it will fit tightly about the valve stem and positively prevent leakage. When rotation is initially imparted to the stem, the nut will tend to rotate therewith, but this tendency will be overcome by the key 18 so that the nut will furnish the needed fulcrum to effect movement of the valve stem and cause the valve head to be carried toward or from its seat. Violent seating of the head is avoided and cracking or distorting of the valve seat is prevented so that the efficiency and life of the valve is increased. The floating nut and the cap nut may be both readily removed from the bonnet so that the packing may be inserted into the bonnet from either end as may be most convenient under any given conditions. The bonnet is elongated so that its packing-holding capacity is increased and ample accommodation for the floating nut is provided in order that any desired pressure may be placed upon the packing, and the bonnet may be made of tubing of any metal so that the cost of manufacturing may be kept to a minimum basis. Any preferred form of packing may be employed and, if it be saturated with a lubricant, the lubricant will be retained in the packing so that loss of the same will be prevented and free movement of the valve stem in opening or closing will be assured.

After the valve is seated, the continued rotation of the stem will cause the floating nut to ride upwardly on the stem and exert a compressing force on the packing so that it will fit tightly around the stem and against the wall of the bonnet whereby leakage is positively prevented. The valve is adapted for use in liquid, steam or gas lines and is especially advantageous in steam-fitting.

Having thus described the invention, what is claimed as new is:

1. In a cut-off valve, the combination of a bonnet, a floating nut therein, packing supported by the nut, a stop collar at the lower end of the bonnet, means to limit upward movement of the nut, and a valve stem passing axially through the nut and the bonnet and operatively engaged with the nut.

2. In a cut-off valve, the combination of a bonnet having a longitudinal groove in its bore at its lower end, a floating nut fitted in the bonnet and having an external longitudinal groove in its upper portion alining with and overlying the groove in the bonnet, a key engaged in said grooves and arranged to abut the upper end of the groove in the bonnet and the lower end of the groove in the nut, packing supported by the nut, and a valve stem extending axially through the nut and the bonnet and operatively engaged with the nut.

In testimony whereof I affix my signature.

TREVILLIE OWEN MARTIN. [L. S.]